US 6,497,189 B1

(12) United States Patent
Vollmerhausen

(10) Patent No.: US 6,497,189 B1
(45) Date of Patent: Dec. 24, 2002

(54) HOVER-EFFECT CRAFT

(76) Inventor: Robert H. Vollmerhausen, 122 S. Van Buren St., Rockville, MD (US) 20850

( * ) Notice: Subject to any disclaimer, the term of this patent is extended or adjusted under 35 U.S.C. 154(b) by 0 days.

(21) Appl. No.: 09/981,538

(22) Filed: Oct. 18, 2001

(51) Int. Cl.[7] .................................................. B63B 1/34
(52) U.S. Cl. ...................... 114/67 A; 114/272; 114/274
(58) Field of Search .............................. 114/67 A, 67 R, 114/271, 272, 274; 244/106; 180/116, 117

(56) References Cited

U.S. PATENT DOCUMENTS

| | | | |
|---|---|---|---|
| 2,476,482 A | | 7/1949 | Custer ........................ 244/12 |
| 3,039,550 A | | 6/1962 | Beardsley ..................... 180/7 |
| 3,190,582 A | | 6/1965 | Lippisch ..................... 244/12 |
| 3,221,831 A | | 12/1965 | Weiland ........................ 180/7 |
| 4,046,215 A | * | 9/1977 | Hietanen et al. ............ 180/116 |
| 5,071,088 A | | 12/1991 | Betts ........................... 244/12 |
| 5,242,132 A | * | 9/1993 | Wukowitz .................. 114/262 |
| 5,950,559 A | * | 9/1999 | Klem ......................... 114/272 |
| 6,164,401 A | | 12/2000 | Vollmerhausen ............ 180/119 |
| 6,325,011 B1 | * | 12/2001 | Klem ......................... 114/272 |

* cited by examiner

*Primary Examiner*—Stephen Avila

(57) ABSTRACT

A Hover Effect craft is disclosed that includes a
  a forward wing element;
  a plurality of high-pressure air valve elements;
  at least one air conduit member disposed to a leading edge of the forward wing element;
  at least two engine/prop assemblies; each engine/prop assembly including at least one floatation tank element;
  each one of said engine/prop assemblies depending from the terminal ends of the forward wing element;
  a platform element disposed to the trailing edge of the forward wing element so as to be rigidly affixed to the trailing edge of the forward wing element; the platform element including cutout cavities for a plurality of inflatable members and cutout cavities for a plurality of air-fan blower elements;
  a suspension device;
  a passenger compartment member disposed above the suspension device.

4 Claims, 5 Drawing Sheets

HOVER-EFFECT CRAFT

FIELD OF THE INVENTION

This invention relates an apparatus for traveling at high speeds over water; and more particularly, to an apparatus combining a mode of operation of a ground-effect ship with a plurality of marine engine assemblies so as to provide a benefit of greater fuel economy, precise maneuvering, and control in all operating conditions.

BACKGROUND TO THE INVENTION

There is a long felt need throughout the industrialized world to develop alternative transportation systems. Cities are crowded, choked with traffic, and even air transportation systems are increasingly operating at full capacity. Water in the form of rivers, bays, and coastal waterways, are a transportation resource that is not, at this time, being effectively used.

In the United States alone, Long Island Sound, the Chesapeake Bay, the Great Lakes, and many major rivers, are a potential transportation resource. Among the difficulties in developing water transportation is the inherent lack of speed with conventional shipping, and the rough ride associated with hydroplaning ships.

Conventional travel by water is slow and is currently used almost exclusively for freight hauling or leisure travel. The present invention teaches and discloses an apparatus for traveling at high speeds over water with a comfortable ride, dynamic stability, and efficient mechanical traction of props in water.

The instant invention combines the speed of ground effect aircraft, with operationally integrated engine/prop assemblies so as to provide the apparatus with high-speed operation that also provides flight stability.

BACKGROUND—DESCRIPTION OF THE PRIOR ART

U.S. Pat. No. 6,164,401 issued to Vollmerhausen discloses a Ground Effect Ship utilizing a wing-hull to support a passenger compartment piggyback style. The wing-hull member includes a plurality of pontoon elements, on each wingtip of the wing-hull member, so that, as the apparatus gains cruising speed, a port or a starboard pontoon biases against the waters surface to stabilize the apparatus in sailing-flight operation.

U.S. Pat. No. 3,190,582, issued to Lippisch discloses a Ground Effects Utilizing and Transition Aircraft that includes retractable landing gear, enclosed in a floatation/wing combination so as to transition from a boat operation to ground effect and, at higher speeds, to operate as a true aircraft.

U.S. Pat. No. 2,476,482, issued to Custer, discloses a Channeled Airplane Wing so as to position a propeller near a trailing edge of a wing channel to increase aerodynamic lift.

U.S. Pat. No. 5,071,088, issued to Betts, discloses a High Lift Aircraft wherein a canard is attached between a port and a starboard fuselage to provide pitch control for the apparatus.

U.S. Pat. No. 3,039,550, issued to Beardsley, discloses an Airborne Surface Vehicle and provides a plenum chamber/body shell design that flows air downward such that the air compresses under the apparatus.

U.S. Pat. No. 3,221,831, issued to Weiland, discloses a Winged Surface Effect Vehicle that includes oppositely disposed floatation pontoons with a wing structure communicating between the floatation structures.

None of the prior art, taken collectively or individually, discloses an apparatus with a ground-effect flight operation in combination with multiple in-water propulsion; and further, none of the prior art discloses an apparatus wherein a plurality of marine engines pull the apparatus into a stable flight configuration.

OBJECTS OF THE INVENTION

A primary object of the invention is to provide a means for high-speed water ground-effect transportation utilizing a forward wing element in combination with a trailing platform element.

Another object of the invention is to provide an aerodynamic lifting means so as to stabilize the apparatus in operation against variant forces of wind and wave.

Another object of the invention is to provide a hydrodynamic lifting means so as to lift the apparatus to a dynamic waterline while the apparatus is operating under flight conditions.

Another object of the invention is to provide a forward wing element so as to generate a coefficient of aerodynamic lift that functions to dampen or cancel vibration caused by the hydrodynamic passage of the apparatus through water.

Another object of the invention is to provide a means for maneuvering operation so as to turn and maneuver the apparatus in 'close' operating conditions, such as when docking.

Another object of the invention is to provide a means for suspension so as to rotate a passenger compartment as the apparatus maneuvers through turns.

PREFERRED EMBODIMENT-DESCRIPTION

Figure 1:
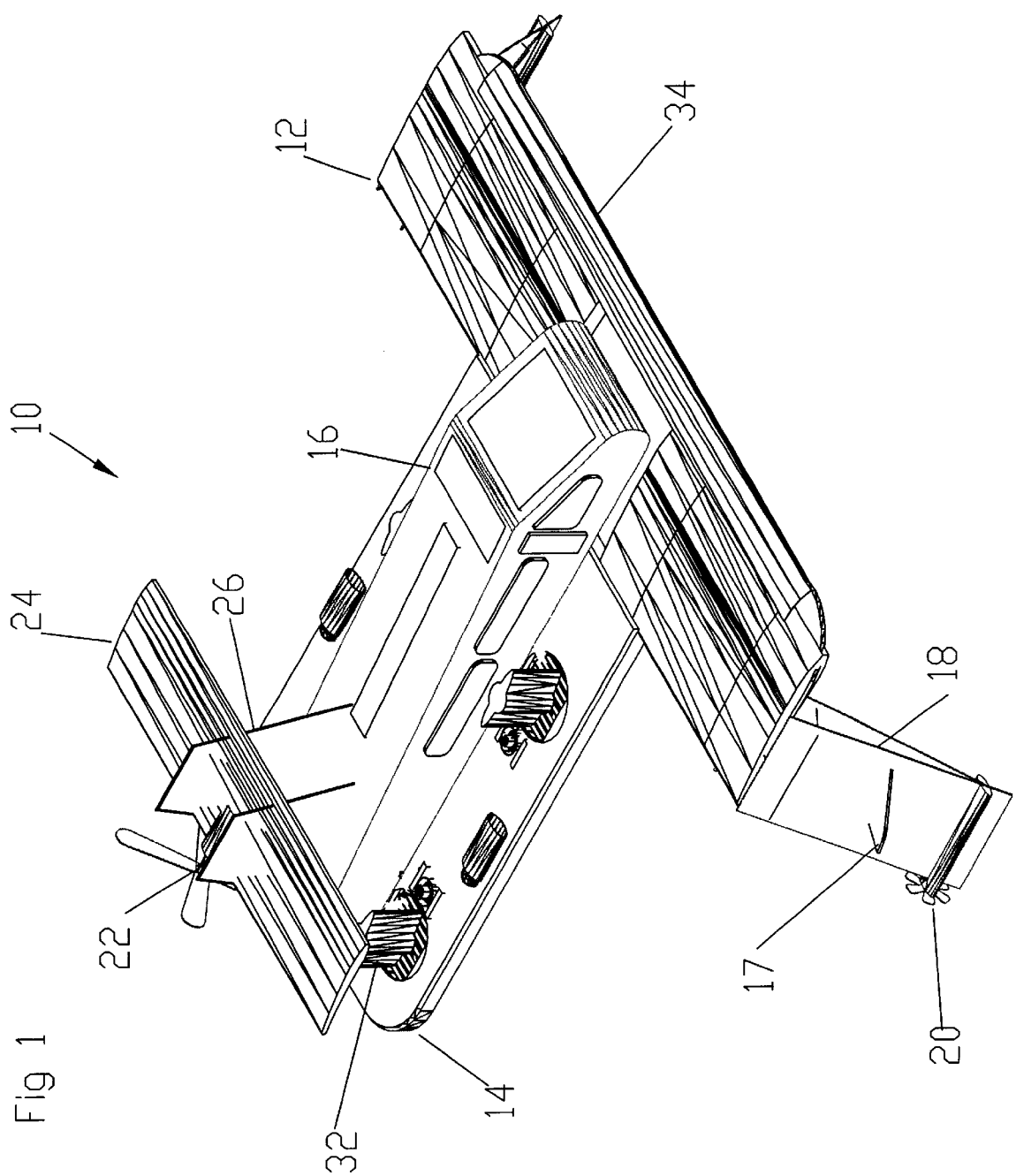
FIG. 1 is a perspective view of the device in use.

Referring now to the drawing where like numerals represent like elements throughout, it will be apparent that apparatus (10) includes:

A forward wing element, a first aerodynamic lifting means, a means for aerodynamic lift, a plurality of engine/prop assemblies, a first hydrodynamic lifting means, and a second hydrodynamic lifting means, a passenger compartment disposed above a platform element, a suspension means disposed within the platform element, a compression means, and a means for auxiliary power.

Apparatus (10) includes a forward wing element (12) as shown best in FIG. 1.

Forward wing element (12) includes a first means for aerodynamic lift, such as a cambered upper surface as illustrated in FIG. 1 (not number), so as to generate a coefficient of lift as the apparatus (10) gains speed. First aerodynamic lifting means, such as the cambered aerodynamic profile of forward wing element (12), generates a coefficient of aerodynamic lift, generated along the wingspan of forward wing element (12) so as to lift the engine/prop assemblies 20/20') higher in the water, lift passenger compartment (16), and also dampen vibrations resulting from the passage of the engine/prop assemblies (20/20') through the water.

Forward wing element (12) includes at least two engine/prop assemblies (20/20'), Each one of the engine/prop assemblies (20/20') depends downward from the outer reaches of forward wing element (12). Each one of the engine/prop assemblies (20/20') include at least one marine engine, (not shown/not numbered). The marine engines are of any conventional marine engine technology. Engine/prop assemblies (20/20') pull the apparatus through the water, providing substantially all the motive power to drive the apparatus forward at a standard cruising speed.

Figure 2:
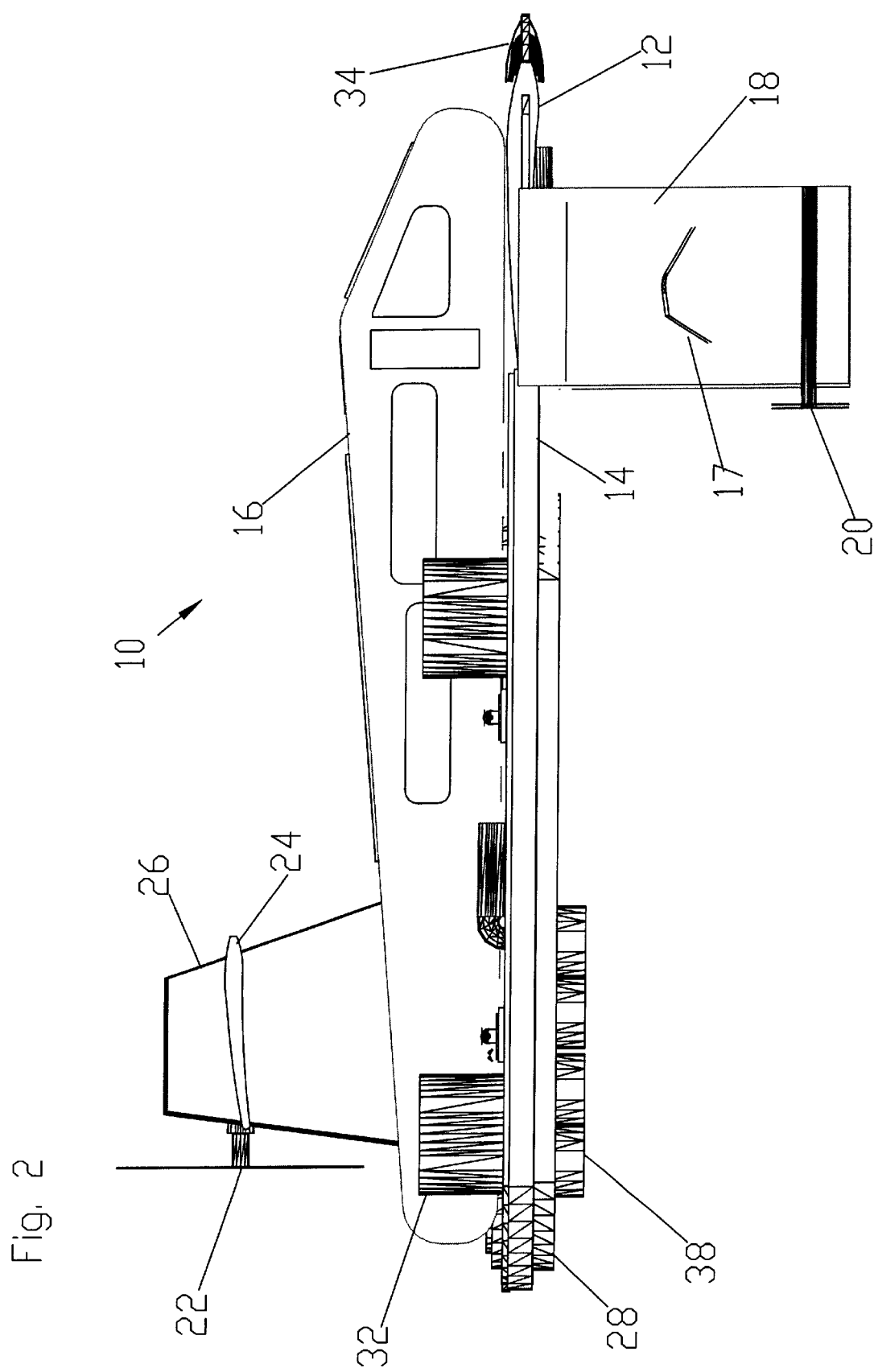
FIG. 2 is a right side view of the apparatus.

An aircraft engine (22) is disposed substantially as shown in FIG. 2 so that, as the apparatus (10) is traveling at high speed, in any operating condition where additional engine noise is not a factor, then an aircraft engine/prop (22), increases apparatus speed and maneuverability.

A notch cutout, shown best in FIG. 1 (not numbered) reduces aerodynamic lift in the area of the notch cutout. Hydrodynamic and aerodynamic coefficients of lift are distributed outward, toward the outer reaches of the forward wing element with a port and starboard coefficient of lift maximizing at the outer reaches of the forward wing element (12). The maximizing of lift at the outer reaches of the forward wing element (12) generates a wide lifting 'footprint' for apparatus (10); and maximizing lift at the outer reaches of the forward wing element (12) dampen and suppresses vibration generated by the forward motion of the engine/prop assemblies (20/20') through the water.

Figure 3:
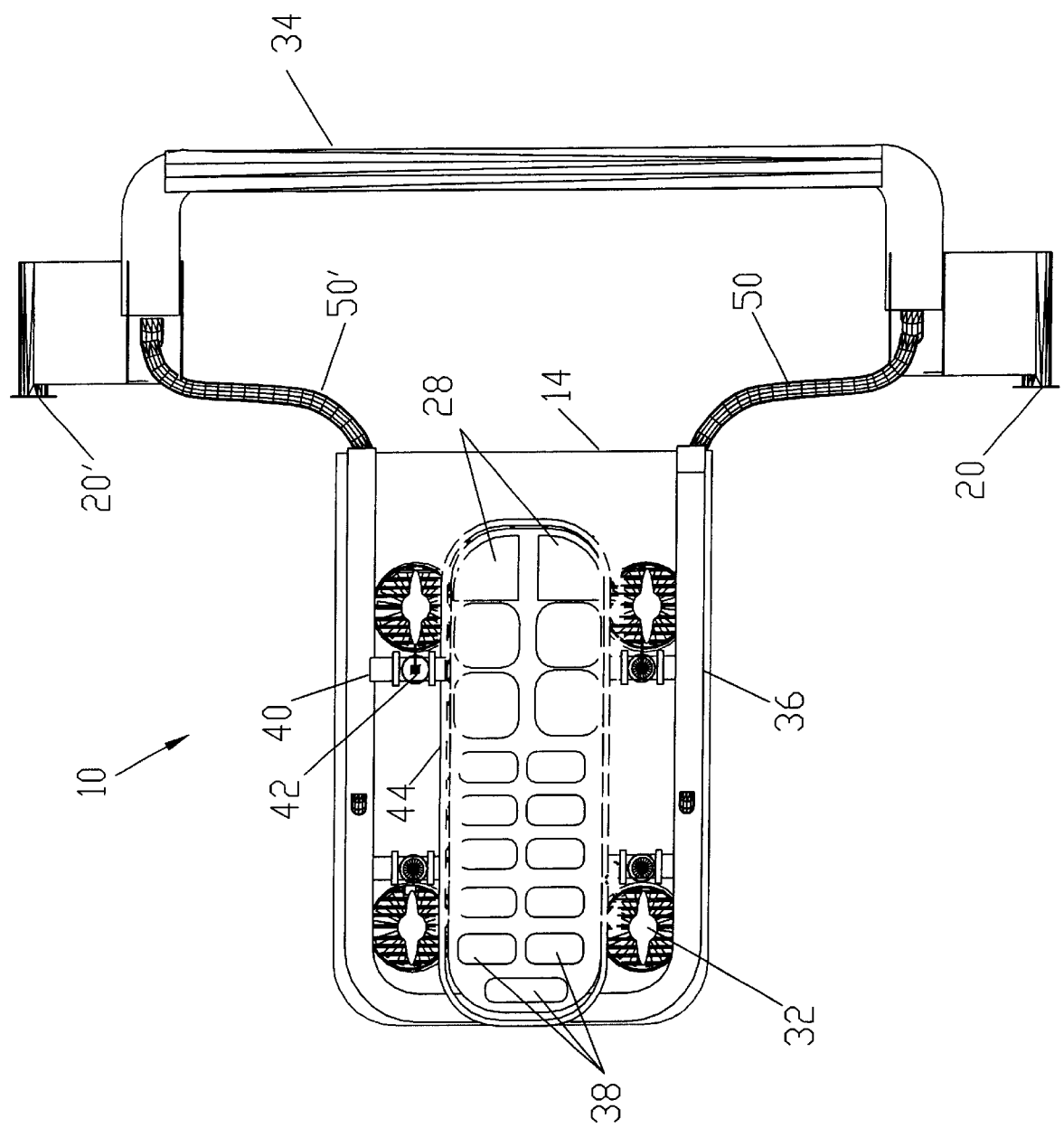
FIG. 3 is top view illustrating an arrangement of air conduits in a platform element.

Forward wing element (12) includes a second means of aerodynamic lift, such as a plurality of air jet valve elements (30) as shown best in FIG. 3. Each one of the air jet valve elements (30) generates a coefficient of lift of over forward wing element (12) by venting high-pressure air from air conduit (34). Each one of the air jet valve elements communicates with high-pressure air conduit (34). Air distributed over the cambered surface of forward wing element (12) reinforces a volumetric flow of air over the wing and generates a secondary lifting effect. Forward wing element (12) is disposed between two engine/prop assemblies (20/20') that are located at the terminal ends of the forward wing element (12).

Each one of engine/prop assemblies (20/20') provides high-pressure air through any conventional air compression technology. High-pressure air is supplied to each one of the air jet valve elements (30) through air conduit (34) as shown best in FIG. 3. Air conduit member (34) is disposed to a leading edge of the forward wing element (12) as shown in FIG. 2.

High-pressure air vented over forward wing element's cambered surface, as the apparatus is stopped or operating at low speed, generates an apparent wind over the forward wing element (12's) cambered surface.

Apparatus (10) includes a first hydrodynamic lifting means, such as a plurality of floatation tanks (18/18'). Each one of the engine/prop assemblies (20/20') includes at least one floatation tank element (18/18') as shown best in FIGS. 1 and 2. Floatation elements (18/18') pump water out of ballast tanks (not numbered/not shown) so as to upwardly displace forward wing element (12).

Figure 4:
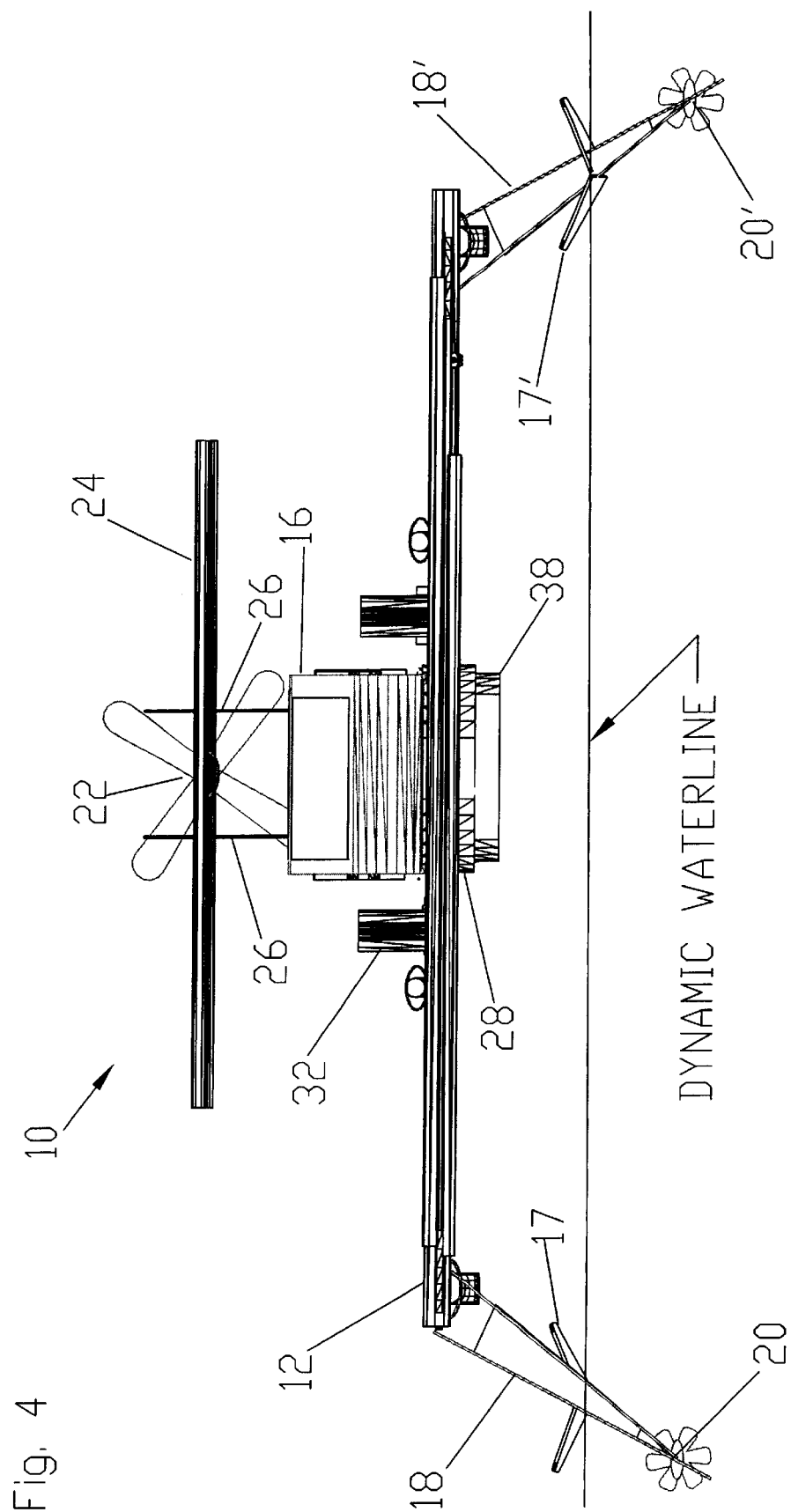
FIG. 4 is a front view of the apparatus.

Apparatus (10) includes a second means for hydrodynamic lift; such as hydroski elements (17/17') disposed to the outer reaches of each one of the engine/prop assemblies (20/20'). Each one of the floatation tank elements (18/18') includes at least one hydroski element (17/17') substantially as shown in FIGS. 1 and 4.

As a starboard or port side of the forward wing element (12) rises, the apparatus rotates through a center of gravity, dipping the opposite forward wing element tip down into the water. As a hydroski element (17/17') is disposed downward, into the water, a higher coefficient of lift is generated on that hydroski element, lifting the hydroski element to a dynamic waterline.

Each one of the engine/prop assemblies (20/20') includes an engine (not shown/not numbered) of any suitable marine engine technology that also includes an engine generated air compressor means (not shown/not numbered) that supplies compressed air to conduit means 50/50') as shown in FIG. 3. Conduit means (50/50') surcharge outer conduit (36), that is disposed to the periphery of a platform element (14) so as to energize a means for suspension (28) with compressed air. Conduit means (50/50') provides compressed air for the actuation of a means for suspension (28) and a means for floatation (38).

Conduit means (50/50') is a continuation of air conduit (36) that extends transversely across the leading edge of forward wing element (12). High-pressure air from each one of the engine/prop assemblies (20/20') actuate air jet elements (30) and the terminal ends of air conduit (34) extends around, on each side, communicating with A broad, flat, platform element (14) is disposed rearward of forward wing element (12). Platform element (14) is rigidly disposed to forward wing element (12) substantially as shown in FIG. 1. Platform element (14) consists, essentially, of a broad flat member, as shown in FIG. 3, with a plurality of 'cutouts' or orifices (not numbered). Platform element (14) disposed to the trailing edge of the forward wing element so as to be rigidly affixed to the trailing edge of the forward wing element; the platform element includes cutout cavities for a plurality of inflatable members and cutout cavities for a plurality of air-fan blower elements;

As apparatus (10) increases speed, platform element (14) prevents the forward-mounted marine engines (not shown/not numbered) from 'riding up' as power is applied. As power is applied to the engines/prop assemblies, the apparatus (10) 'digs-in' by the stern drives platform element (14) down by the stern.

As apparatus (10) gains speed ambient air compresses under platform element (14). Apparatus (10) lifts on the ground-effect as air compresses under platform element (14) and under forward wing element (12). At operating speeds platform element (14) 'feathers' behind forward wing element (12) as may be likened to the flight feathers of an arrow shaft in flight.

Compressing ambient air below the platform element (14), in combination with a lead-driving mechanism (the forward wing element (12) and attached engine/prop assemblies (20/20')), generates a stable flight envelope for apparatus (10).

Figure 5:
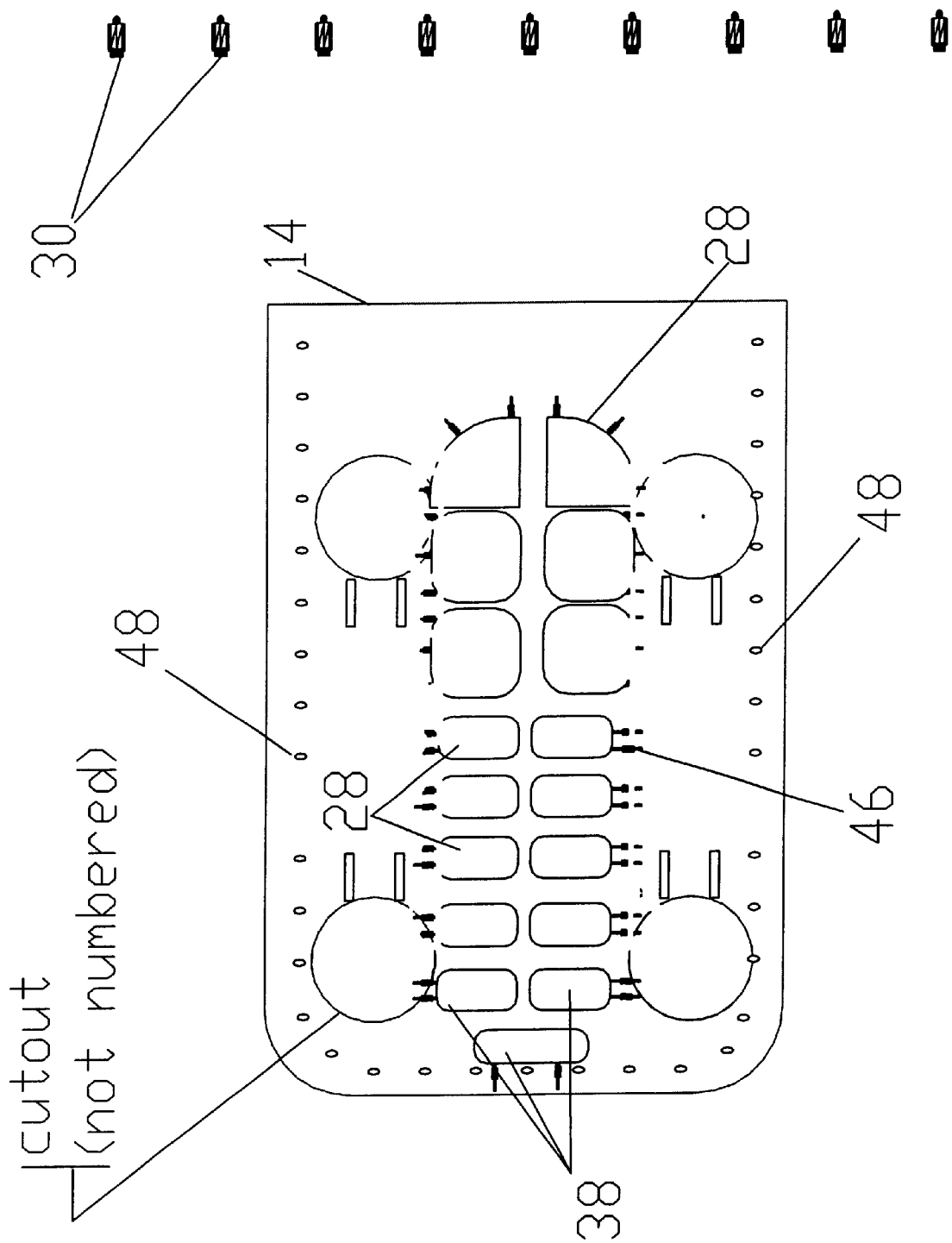
FIG. 5 is top view of a valve layout plan for a platform element.

Means for compression (32), as shown in FIG. 3, includes a plurality of compressor fan elements. Each one of the fan elements (not individually numbered) is powered by compressed air communicated from conduit (36), through connector element (40) as diverter valve (42) is opened. As means for compression (32) is actuated, valve elements (48) actuate, as shown in FIG. 5. Actuation of valve elements (48) vents compressed air downward so as to minimize the loss of compressed air injected under apparatus (10) by means for compression (32). Means for compression (32) is actuated as the apparatus is standing still or traveling at speeds too slow for ambient air to lift the platform element (14) free of the waters' surface.

As apparatus (10) increases speed, means for compression is deactuated as ambient air flows under the broad, flat, configuration of platform element (14), lifting it free of the water.

In flight, engine/prop assemblies (20/20') are disposed to the outer reaches of the forward wing element (12) to generate a wide stance in the longitudinal (roll) axis while platform element (14) generates flight stability in the apparatus' pitch axis. Aerodynamic lift, on the outer reaches of forward wing element (12), in combination with hydrodynamic lift on each of the hydroski elements (17/17') effectively resist forces acting through the roll axis to overturn the apparatus. Platform element (14) is rigidly disposed behind forward wing element (12) so as to stabilize the apparatus in the pitch axis. Tail assembly (22/24/26) stabilizes the apparatus in the yaw axis. While floating the apparatus includes floatation tanks (18/18') for stability in the roll axis and a plurality of inflatable elements (38) for stability in the pitch axis.

Means for floatation (38) includes a plurality of inflatable members, as shown in FIG. 5, that actuate by injecting high-pressure air through conduit 36. High-pressure air is communicated to interior plenum (44) through connector (40) and diverter valve (42).

As diverter valve (42) is actuated, air is vented into interior plenum (44). A plurality of air injector valves (46) are arrayed, substantially as shown in FIG. 3, peripheral to each one of the inflatable members (28/38). As each pair of air injector valves (46) is actuated means for suspension (28) actuates. As air injector valves (46) actuate, means for floatation (38) actuates.

Means for floatation (38) displaces the platform element (14) upward to reestablish a static waterline level. Means for floatation (38) is shown best in FIG. 4, depends downward, floating when inflated, so as to support platform element (14) at the stem.

Means for suspension (28) includes a plurality of inflatable members, substantially as shown in FIG. 3 and 5, in longitudinal rows, arrayed oppositely (mirroring) each other. As means for suspension (28) is actuated, a starboard row or a port row of inflatable members are actuated, so as to 'lean' the passenger compartment into a turn. As air is injected into air-inflatable elements (28/38) fuselage compartment (16) is raised or lowered to adjust the riding qualities of the apparatus.

Passenger compartment (16) is disposed above means for suspension (28). Each one of the air-inflatable elements (28) is rigidly affixed to platform element (14) at peripheral edges of each one of the air-inflatable elements (28/38) so as to dispose each one of the air inflatable elements (28) within a 'cutout' (not numbered) of the platform member (14).

At least two sets of air-inflatable elements (28) are disposed opposite each other, substantially as shown in FIG. 3, so that as air is injected from air conduit element (38) into one or more of a set of air-inflatable elements (28), as one set of elements (28) is inflated, passenger compartment (16) is tilted about its longitudinal axis.

PREFERRED EMBODIMENT-OPERATION

As apparatus (10) is driven forward by at least two engine/prop assemblies (20/20'), hydroski elements (17/17') generate a coefficient of lift so as to displace the forward wing element (12) to a dynamic waterline.

Each one of the hydro ski elements (17/17') defines a positive angle of attack with the water. As the apparatus is pulled forward, the increased angle of attack causes the hydro ski elements (17/17') to 'surface' to a dynamic waterline.

Platform element (14) extends rearward from a trailing edge of the forward wing element (12). A leading edge of platform element (14) is rigidly affixed to the trailing edge of the forward wing element (12). As forward wing element (12) is displaced upwardly in the water, the trailing edge of the platform element (14) is disposed to the water's surface; that is 'dragging' along on the surface as the apparatus (10) moves forward. Platform element (14) defines a positive angle of attack with the flow of air under the apparatus; and further, as the platform element (14) is rigidly affixed to the trailing edge of the forward wing element (12), the platform element (14) holds the forward wing element (12) so as to define a positive angle of attack between the forward wing element (12) and a airflow over the forward wing element's cambered surface.

As the large surface area of platform element (14) is pulled through the air, a large coefficient of drag builds up between the flat underside of platform element (14) and the water. Injecting air down into the space between the bottom of the platform element (14) and the waters' surface reduces aerodynamic drag by generating an air cushion under platform element (14).

Air is pumped under the platform element to generate a flow of air that 'lubricates' the passage of the apparatus as it travels within six to ten feet altitude of the waters' surface. Air injected under the platform element (14) reinforces a ground effect.

As apparatus (10) moves forward, each one of the inflatable members (28) is deflated so as to withdraw inflatable members (38) upwardly into a position adjacent to the platform element (14). Retracting each one of the inflatable members (38) reduces aerodynamic resistance to the forward travel of the apparatus.

Means for floatation (38) and means for suspension (28) essentially consist of pluralities of inflatable members substantially as shown in FIGS. 2 and 4. Each one of the inflatable members is disposed within platform element (14) so as to inflate upwardly, so as to cushion passenger compartment (16) or so as to inflate downwardly so as to provide floatation to the platform element.

Means for suspension (28) pneumatically supports passenger compartment (16); and also, defines a concavity on the lower reaches of the platform element (14) so as to 'cup' the air as it flows under the apparatus (10).

As apparatus (10) increases speed, dynamic drag on the platform element (14) in combination with the coefficient of compressed air under the apparatus generates a aerodynamic force to level the apparatus, in ground effect flight; and, as the apparatus is leveled in ground effect flight, to rotate the forward wing element (12) cambered wing surface, in the pitch axis, so as to generate a reduced coefficient of lift over the wing.

At cruising speed, apparatus (10) is lifted onto each one of the hydro ski elements as, concurrently; a coefficient of aerodynamic lift is generated under platform (14) by high-pressure air generated by compression means (32).

Fan blade elements (not numbered) force air under the apparatus, as the apparatus is at rest. Air injector valves (46) actuate in combination with air jet valves (30) to maintain an air cushion under the apparatus. At stationary, or slow speeds, platform element (14), the passenger compartment (16) and the forward wing element (12) are lifted clear of the water.

Vertical tail assembly (22/24/26) generates a secondary means of aerodynamic lift while also stabilizing the motion of the platform element (14) in the pitch and yaw axis. A directional control of prop-wash (not shown, not numbered) 'swings' the back of apparatus (10) around in tight turns.

It will be apparent from the foregoing that the objects and advantages of the invention have been realized; and further, as many minor modifications and changes will be apparent to one skilled in the art, the scope of the invention is limited only by the claims.

What is claimed is:

1. A Hover-Effect Craft, comprising:

a forward wing element, said forward wing element including a first means for aerodynamic lift, said first means for aerodynamic lift including a cambered upper surface, a second means for aerodynamic lift, said second means for aerodynamic lift including a plurality of air valve elements communicating with a high-pressure air conduit so as to generate a secondary lifting effect over said forward wing element, a first and a second means for static displacement, said first means for static displacement including at least two engine/prop assemblies, each one of said engine/prop assemblies including at least one floatation tank member;

each one of said second means for static displacement including a plurality of air inflatable members, a means for suspension, said means for suspension including a plurality of air inflatable members a means for air compression, said means for compression including a plurality of fan elements, said means for air compression including a plurality of air valve elements;

a passenger compartment; said passenger compartment disposed substantially above said means for suspension, at least one said platform element; said platform element rigidly affixed to said means for aerodynamic lift trailing edge, whereby, as first means for static displacement is actuated, and as said means for air compression is actuated, said apparatus is operational in a hovering mode.

2. A Hover Effect Craft as recited in claim 1 wherein:

said first means for static displacement includes:

at least two engine/prop assemblies; each one of said engine/prop assemblies includes a floatation tank;

each one of said engine/prop assemblies is disposed to the terminal ends of said forward wing element;

said second means for static displacement includes at least two inflatable members whereby, as said apparatus is at rest in the water, and as said second means for static displacement is actuated, and as said engine/prop assembly floatation tanks are actuated, said apparatus is disposed substantially level.

3. A Hover Effect Craft as recited in claim 1 wherein:

said means for suspension includes at least two inflatable elements whereby as said apparatus maneuvers in a turn, said passenger compartment is aligned into the turn.

4. A Hover Effect craft, comprising:

a forward wing element; said forward wing element including at least two engine/prop assemblies, each one of said engine/prop assemblies depending from the outer reaches of said forward wing element;

a plurality of high-pressure air valve elements;

each one of said air valve elements disposed within an high-pressure air conduit disposed to a leading edge of said forward wing element; said high-pressure conduit communicating to an air conduit disposed within a platform element;

so that, as said plurality of high-pressure air valves are actuated a coefficient of high-pressure air is generated under said platform element;

a suspension means disposed within said platform wing element;

a passenger compartment member disposed above said suspension means;

at least one sailtail vertical member; whereby as said engine/prop assemblies actuate, and as said high-pressure air valves are actuated, said apparatus is disposed to lift generated by an air cushion under said apparatus.

* * * * *